W. McCONAL.
HARROW.
APPLICATION FILED JAN. 9, 1920.
1,387,008.
Patented Aug. 9, 1921.
3 SHEETS—SHEET 1.
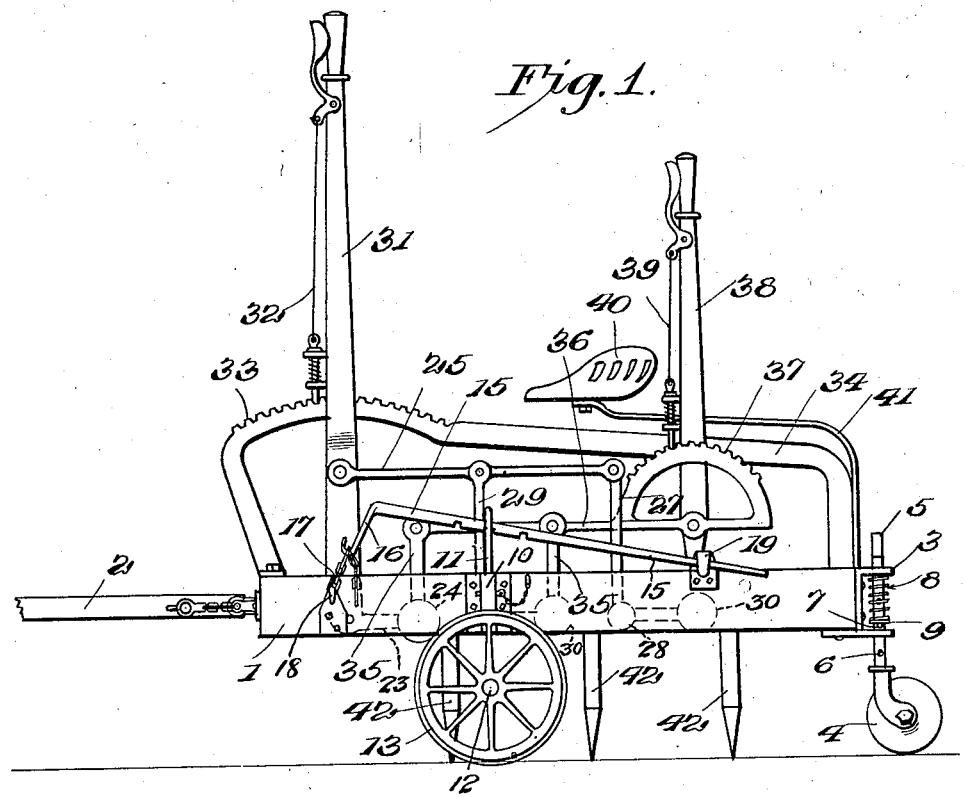
Fig. 1.
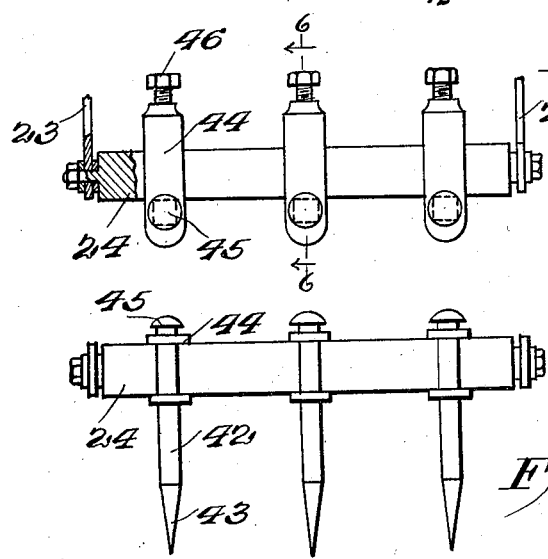
Fig. 5.
Fig. 7.
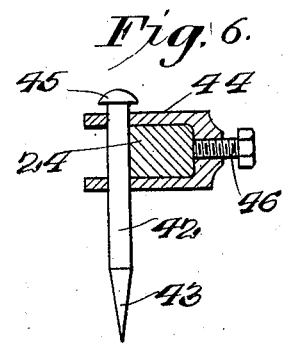
Fig. 6.
Inventor:
W. Mc.Conal.
By Lacey & Lacey
his Attorneys

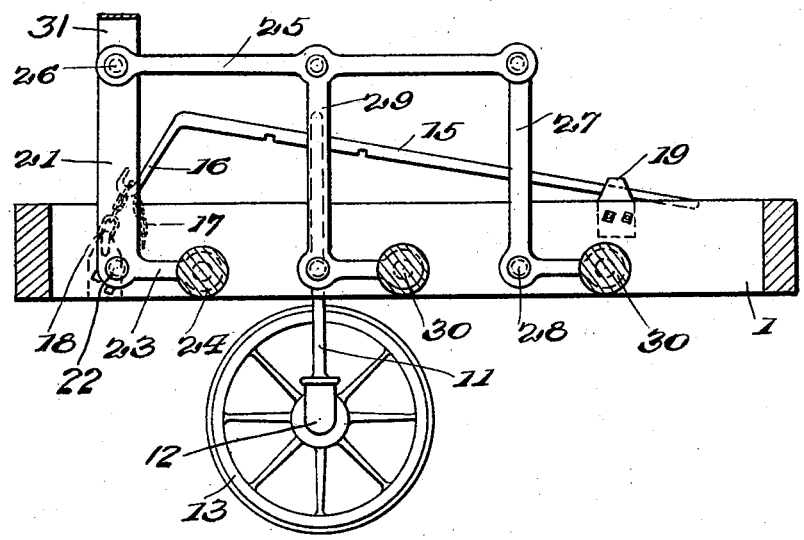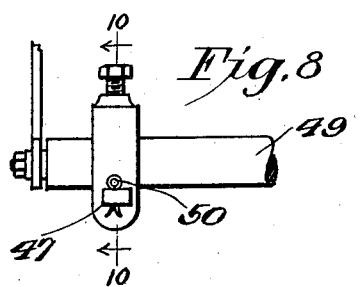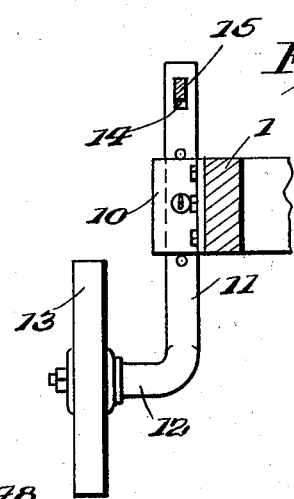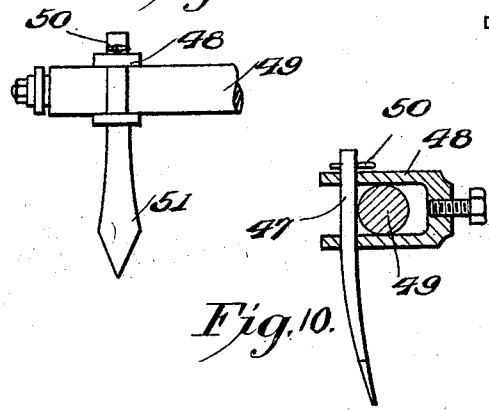

UNITED STATES PATENT OFFICE.

WILLIAM McCONAL, OF SAN SABA, TEXAS.

HARROW.

1,387,008.　　　　Specification of Letters Patent.　　Patented Aug. 9, 1921.

Application filed January 9, 1920. Serial No. 350,326.

*To all whom it may concern:*

Be it known that I, WILLIAM McCONAL, a citizen of the United States, residing at San Saba, in the county of San Saba and State of Texas, have invented certain new and useful Improvements in Harrows, of which the following is a specification.

This invention has for its object the provision of a harrow or cultivator which may be set to run at any desired height above the surface of the ground and in which the teeth or blades may be adjusted to stand at any desired inclination relative to the surface of the soil and also set to penetrate to any desired degree. The invention also seeks to provide simple mechanism whereby all the teeth or blades will be set simultaneously at the same angle and also simultaneously adjusted to enter the soil to the desired extent.

The invention is illustrated in the accompanying drawings, in which—

Figure 1 is an elevation of a harrow embodying my improvements;

Fig. 3 is a longitudinal section on the line 3—3 of Fig. 2;

Fig. 4 is a detail section on the line 4—4 of Fig. 2;

Fig. 5 is a plan view of one harrow bar and the mounting for the teeth employed in connection therewith;

Fig. 6 is a detail section on the line 6—6 of Fig. 5;

Fig. 7 is a front elevation of the harrow bar with the gang of teeth thereon.

Fig. 8 is a detail plan view of a slightly different form of tooth;

Fig. 9 is a front elevation of the same;

Fig. 10 is a detail section on the line 10—10 of Fig. 8.

Figure 2:
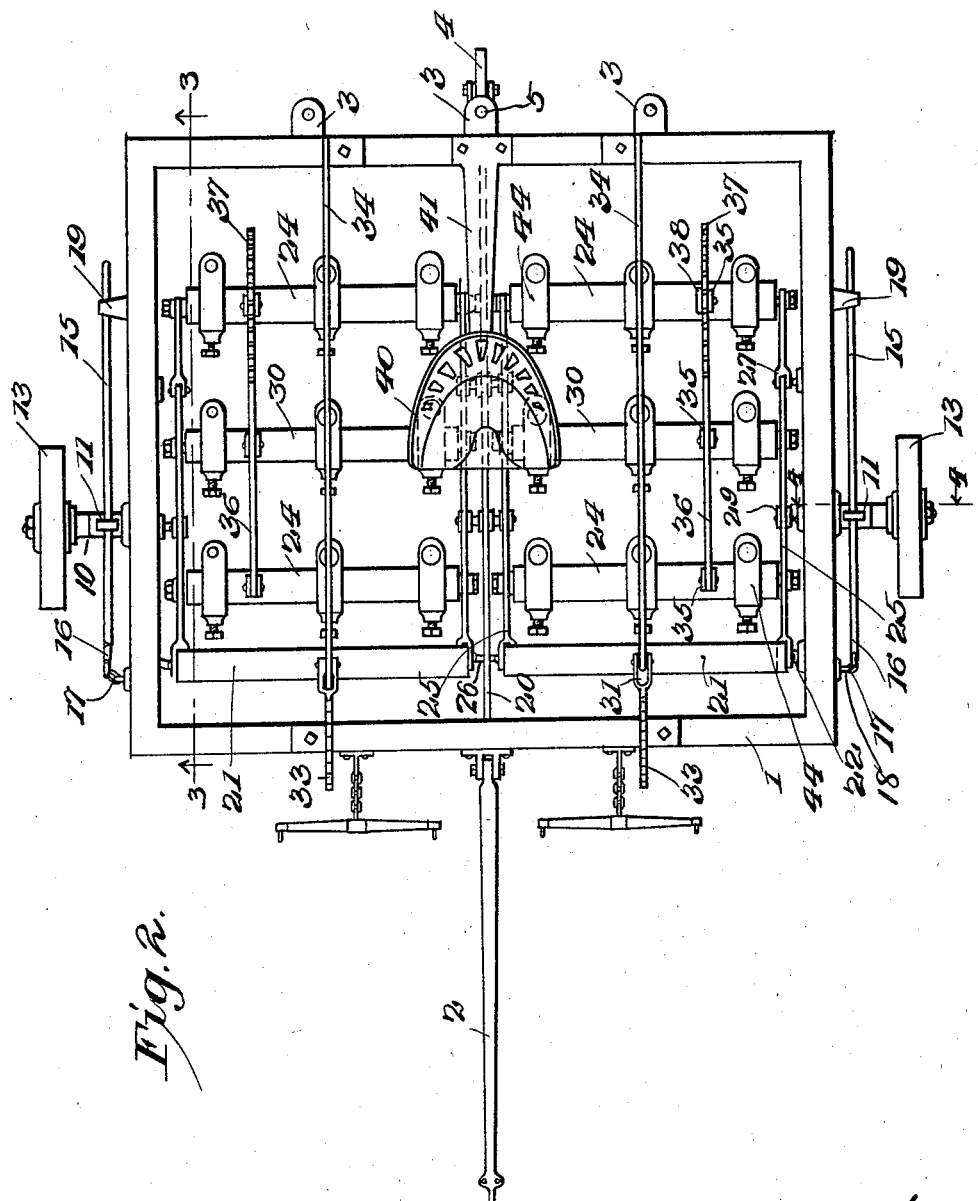
Fig. 2 is a plan view of the same.

In carrying out my invention, I employ a frame 1 which is preferably rectangular and has a draft tongue or pole 2 secured to its front end in any desired manner. On the rear end of the frame, I provide a plurality of brackets 3 in any one of which a caster wheel 4 may be mounted to support the rear end of the frame. By providing a plurality of brackets, the caster may be set to run at the center of the frame or at either side of the center so that it will travel between the rows of plants and not along a row to crush and destroy the vegetation. The spindle or shank 5 of the caster wheel support is provided with a plurality of openings 6 in any one of which the stop pin 7 may be inserted so as to regulate the height at which the wheel will run and a spring 8 is coiled around the shank between the upper arm of the bracket 3 and the washer or other stop 9 resting on the said pin so as to yieldably hold the caster in its lowermost position. Upon each side of the frame, I provide a bracket 10 in which is mounted the vertical post or standard 11 having an axle 12 at its lower end and upon the said axle is a ground wheel or roller 13. In the upper end of the said post 11 is an opening 14 through which a lever 15 may extend and the said lever is provided at its front end with a hook 16 adapted to engage in any one link of a chain 17 which is firmly secured at one end to the frame, as shown at 18. The rear end of the lever is adapted to engage under a retaining hook 19 on the frame so that by engaging the hook 16 in the proper link of the chain 17 and then engaging its rear end under the hook 19, the roller may be held at any desired position vertically relative to the frame and thereby regulate the height of the frame according to the nature of the ground.

The harrow teeth are preferably arranged in two gangs, one at each side of the longitudinal medial line of the frame and along the said line I secure a beam or brace bar 20, a yoke 21 being disposed transversely of the frame adjacent the front end thereof and provided at its ends with trunnions or pivots 22 which are mounted, respectively, in the said bar 20 and the side bar of the main frame as will be readily understood on reference to Fig. 2. From the ends of the yoke 21, rocker arms 23 extend rearwardly and in the ends of the said rocker arms are journaled the extremities of a harrow bar 24 while above said arms connecting rods 25 extend rearwardly, the front ends of these rods being pivoted, as at 26, to the said yokes and the rear ends thereof being pivoted to the upper ends of angle levers 27 which are fulcrumed at their angles, as indicated at 28, upon the side bar of the main frame and the longitudinal supporting bar or brace 20 as will be readily understood. Similar angle levers 29 are pivoted at their upper ends to intermediate points of the connecting bars 25 and fulcrumed at their angles upon the side bar of the main frame and the longitudinal brace 20, while the free end of each angle lever receives a pivot or trunnion at the end of a harrow bar 30 which is the same in all respects as the harrow bar 24. From the center of each yoke 21, a hand lever 31 rises and this hand lever carries a latch 32 which is adapted to coöperate with a rack or segment 33 formed at the front end of a frame 34 which has its extremities secured, respectively, to the front and rear members of the main frame, as shown. It will be readily understood that by moving the lever 31 forwardly or rearwardly the angle levers and rocking arms will be swung vertically about their respective pivots or fulcrums so that the harrow bars will be raised or lowered and this movement will occur simultaneously with all the bars and will be of equal duration with all the bars so that the harrow teeth or blades carried by said bars will be set at uniform heights and may be thereby caused to penetrate the soil to any desired uniform depth or may be raised entirely clear of the surface as may be desired. Rising from each harrow bar at any convenient point thereof, but at the same distance from the side of the main frame on all the bars, is a crank or lever arm 35, the upper ends of all said arms being pivoted to a connecting rod or link 36 on the rear end of which is provided a rack or segment 37 concentric with the pivotal connection between the link and the rearmost arm which arm is carried upwardly to form an operating hand lever 38 equipped with a latch 39 to coöperate with the said segment or rack. It will be readily understood that by moving the lever 38 forwardly or rearwardly the several harrow bars will be caused to simultaneously rock in their bearings in the ends of the rocker bars 23 and the angle levers 27 and 29 so that the teeth or blades carried by said bars will be set at any desired uniform angle relative to the surface of the soil. As shown in Fig. 2, the harrow bars are arranged in duplicate gangs at each side of the central brace or supporting bar 20 and the hand levers are arranged within convenient reach of a driver occupying the seat 40 which is carried by a spring standard 41 secured upon the rear bar of the main frame.

The harrow teeth or blades may be of any desired form. In Figs. 1 to 6, I have illustrated a harrow tooth consisting of a straight shank or bar 42 having a tapered lower end 43 which will readily penetrate the ground and this tooth is inserted through openings provided in the ends of a U-shaped bracket or clamping plate 44 which is fitted on the harrow bar with its branches or sides engaging the top and bottom of the same respectively, as clearly shown in Fig. 6. The tooth is provided at its upper end with a head or stop 45 which is adapted to bear upon the upper side of the clamping plate or bracket 44 and thereby prevent the tooth dropping entirely through the said bracket while in the head or end of the bracket is mounted a set screw 46 engaging the rear of the harrow bar so that when the screw is turned home the bracket or clamping plate will be caused to move across the harrow bar and thereby bind the shank 42 of the tooth between the edge of the bar and the opposed walls of the openings through the clamping bracket so that the tooth will be firmly held and will not become dislodged while in use. The set screw will not enter the harrow bar but has its end bearing against the same so that rotation of the screw will cause the head of the clamping plate to act as a nut and travel longitudinally of the screw and thereby effect the desired clamping of the tooth and it will be readily understood that any desired number of teeth may be employed within the capacity of the harrow frame and that they may be placed at any desired distance apart. In the drawings, I have illustrated three teeth on each bar spaced equidistantly.

In Figs. 8, 9 and 10, I have illustrated a tooth having its lower end flattened so as to present a more extended surface to the loosened soil and thereby tend to turn the same more effectively to the sides. The shank 47 is inserted through a bracket 48 and secured against the harrow bar 49 in the same manner as the previously described tooth is mounted and secured, but instead of the head 45 a cotter pin 50 is employed, said pin being inserted through the shank near the upper extremity of the same and resting upon the top of the bracket or clamping plate 48 to prevent dropping of the tooth. As shown at 51, the tooth is flattened and expanded slightly laterally so that a somewhat wider path will be cut by the tooth as the implement is drawn over the field.

From the foregoing description, taken in connection with the accompanying drawings, it will be seen that I have provided an exceedingly simple harrow or cultivator in which the ground-engaging implements may be easily set to run at any desired angle and penetrate the soil to any desired depth and uniformity in the adjustment of all the teeth in one gang will be positively attained. The gang at one side of the main frame may be set at a different angle from the gang at the other side of the frame and this difference in adjustment may sometimes be found advantageous. The mechanism is all simple in the construction and arrangement of its parts and is not apt to get out of order while the construction is such that the machine will be found strong and durable.

Having thus described the invention, what is claimed as new is:

1. An agricultural implement comprising a main frame, a plurality of harrow bars mounted in the main frame, means for simultaneously adjusting all said bars rotatively, and means for simultaneously raising or lowering said bars.

2. In an agricultural implement, the combination of a main frame, a plurality of rocker arms mounted in the frame, harrow bars carried by said rocker arms, and means for simultaneously swinging said rocker arms in a vertical plane.

3. In an agricultural implement, the combination of a main frame, a plurality of rocker arms mounted in the frame, link connections between the rocker arms whereby to effect simultaneous movement thereof, and harrow bars carried by the free ends of said arms.

4. In an agricultural implement, the combination with a main frame, of a yoke pivotally mounted at the front end of the frame, a lever rising from said yoke, means coöperating with said lever to hold the same in a set position, rocker arms extending from said yoke, angle levers fulcrumed upon the main frame, links connecting the yoke with the angle levers, and harrow bars mounted in the free ends of said angle levers and the rocker arms.

5. In an agricultural implement, the combination of a main frame, a plurality of rocker arms mounted in the main frame, harrow bars journaled in the free ends of said rocker arms, levers rising from the harrow bars, a link connection between the said levers whereby to simultaneously rotate the harrow bars, and link connections between the several rocker arms whereby to simultaneously swing said arms in a vertical plane.

In testimony whereof I affix my signature.

WILLIAM McCONAL. [L. S.]